United States Patent
Lin et al.

(10) Patent No.: US 10,642,974 B2
(45) Date of Patent: May 5, 2020

(54) APPLICATION SECURITY PROTECTION PROCESSING METHOD AND DEVICE, AND TERMINAL DEVICE

(71) Applicant: BEIJING KINGSOFT INTERNET SECURITY SOFTWARE CO., LTD., Beijing (CN)

(72) Inventors: Yian Lin, Beijing (CN); Shiduo Yang, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 223 days.

(21) Appl. No.: 15/756,532

(22) PCT Filed: Aug. 12, 2016

(86) PCT No.: PCT/CN2016/094814
§ 371 (c)(1),
(2) Date: Feb. 28, 2018

(87) PCT Pub. No.: WO2017/050056
PCT Pub. Date: Mar. 30, 2017

(65) Prior Publication Data
US 2018/0247056 A1 Aug. 30, 2018

(30) Foreign Application Priority Data
Sep. 22, 2015 (CN) .......................... 2015 1 0607906

(51) Int. Cl.
*H04W 12/00* (2009.01)
*G06F 21/54* (2013.01)
(Continued)

(52) U.S. Cl.
CPC ............ *G06F 21/54* (2013.01); *G06F 21/554* (2013.01); *G06F 21/6245* (2013.01); *G06F 21/81* (2013.01); *H04W 12/0027* (2019.01)

(58) Field of Classification Search
CPC ........................... G06F 21/54; H04W 12/0027
See application file for complete search history.

(56) References Cited

U.S. PATENT DOCUMENTS 8,595,810 B1 * 11/2013 Ben Ayed ........... H04L 63/0815
713/168
10,152,197 B1 * 12/2018 Xue ........................ G06F 9/453
(Continued)

FOREIGN PATENT DOCUMENTS

CN 102207823 10/2011
CN 103853433 6/2014
(Continued)

OTHER PUBLICATIONS

IBM Privacy for Instant-Message or Email Popups Original Publication Date: Mar. 16, 2009 IP.com No. IPCOM000180738D (Year: 2009).*
(Continued)

*Primary Examiner* — David J Pearson
(74) *Attorney, Agent, or Firm* — Hodgson Russ LLP

(57) ABSTRACT

An application security protection processing method and device, and terminal device are disclosed. The method includes: acquiring a sample application from one or more applications installed on a terminal device; performing an image processing to a first sample icon of the sample application, and generating a second sample icon having a protection mark; and displaying an application security protection prompt message carrying the second sample icon on an interface of the terminal device.

18 Claims, 5 Drawing Sheets

(51) Int. Cl.
  *G06F 21/55* (2013.01)
  *G06F 21/62* (2013.01)
  *G06F 21/81* (2013.01)

(56) References Cited

U.S. PATENT DOCUMENTS

| | | | | |
|---|---|---|---|---|
| 2010/0262619 | A1* | 10/2010 | Zargahi | G06F 8/61 |
| | | | | 707/770 |
| 2014/0004832 | A1* | 1/2014 | Dabbiere | H04W 76/10 |
| | | | | 455/411 |
| 2014/0038561 | A1* | 2/2014 | Wang | H04W 12/02 |
| | | | | 455/411 |
| 2014/0179377 | A1* | 6/2014 | Song | H04M 1/72522 |
| | | | | 455/566 |
| 2014/0208225 | A1* | 7/2014 | Anand | G06F 21/31 |
| | | | | 715/741 |
| 2014/0378099 | A1* | 12/2014 | Huang | H04M 1/67 |
| | | | | 455/411 |
| 2015/0121306 | A1* | 4/2015 | Fundament | G06F 3/0482 |
| | | | | 715/811 |
| 2016/0034695 | A1* | 2/2016 | Won | G06F 21/62 |
| | | | | 726/28 |

FOREIGN PATENT DOCUMENTS

| | | |
|---|---|---|
| CN | 104049847 | 9/2014 |
| CN | 104461243 | 3/2015 |
| CN | 104468583 | 3/2015 |
| CN | 104679387 | 6/2015 |
| CN | 105205392 | 12/2015 |

OTHER PUBLICATIONS

WIPO, English translation of the ISR/WO for PCT/CN2016/094814, dated Nov. 7, 2016.

SIPO, Office Action for CN App. No. 201510607906, dated Aug. 16, 2017.

\* cited by examiner

APPLICATION SECURITY PROTECTION PROCESSING METHOD AND DEVICE, AND TERMINAL DEVICE

CROSS-REFERENCE TO RELATED APPLICATIONS

This application is a U.S. national phase application of International Application No. PCT/CN2016/094814, filed on Aug. 12, 2016, which claims priority to and benefits of Chinese Patent Application Serial No. 201510607906.4, filed with the State Intellectual Property Office of P. R. China on Sep. 22, 2015, the entire content of which is incorporated herein by reference.

TECHNICAL FIELD

The present disclosure relates to the field of communication technology, and more particularly, to an application security protection processing method, an application security protection processing device and a terminal device.

BACKGROUND

With a rapid development of communication technology and a promotion of various network applications, an interest application may be installed on a terminal device by a user as needed so as to acquire information or chat with others.

More and more applications are installed on the terminal device, and these applications have different characteristics. Some are power-consumed, such as game applications, and some are particularly private, such as social applications. Taking a social application, such as Wechat, as an example, when a message arrives, the terminal device may display the arrived message in a prompt message on a current user interface in the related art, even if the terminal device is locked. As operating systems are different, some terminal devices display the prompt message in the middle of the user interface, while some terminal devices display the prompt message in a prompt bar on the top of the user interface. However, in many occasions, the user is unable to see the prompt message displayed on the terminal device in real time. If the prompt message is seen by others, for example if there is more sensitive information, it will cause privacy leaks.

Therefore, it is required to provide a securely prompting method so as to prompt the user to perform a systematic security monitoring management on various applications in the terminal device.

SUMMARY

Embodiments of the present disclosure provide an application security protection processing method. The application security protection processing method includes: acquiring a sample application from one or more applications installed on a terminal device; performing an image processing to a first sample icon of the sample application, and generating a second sample icon having a protection mark; and displaying an application security protection prompt message carrying the second sample icon on an interface of the terminal device.

Embodiments of the present disclosure provide a terminal device. The terminal device includes a housing, a processor, a receiver, a memory, a circuit board, and a power supply circuit. The circuit board is enclosed by the housing. The processor and the memory are positioned on the circuit board. The power supply circuit is configured to provide power for respective circuits or components of the terminal device. The memory is configured to store executable program codes. The processor is configured to run a program corresponding to the executable program codes by reading the executable program codes stored in the memory, to perform the above application security protection processing method.

Embodiments of the present disclosure provide a storage medium with one or more modules stored. When the one or more modules are executed by an electronic device, the electronic device is configured to execute the above application security protection processing method.

Embodiments of the present disclosure provide an application program. When the application program is running, the above application security protection processing method is executed.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
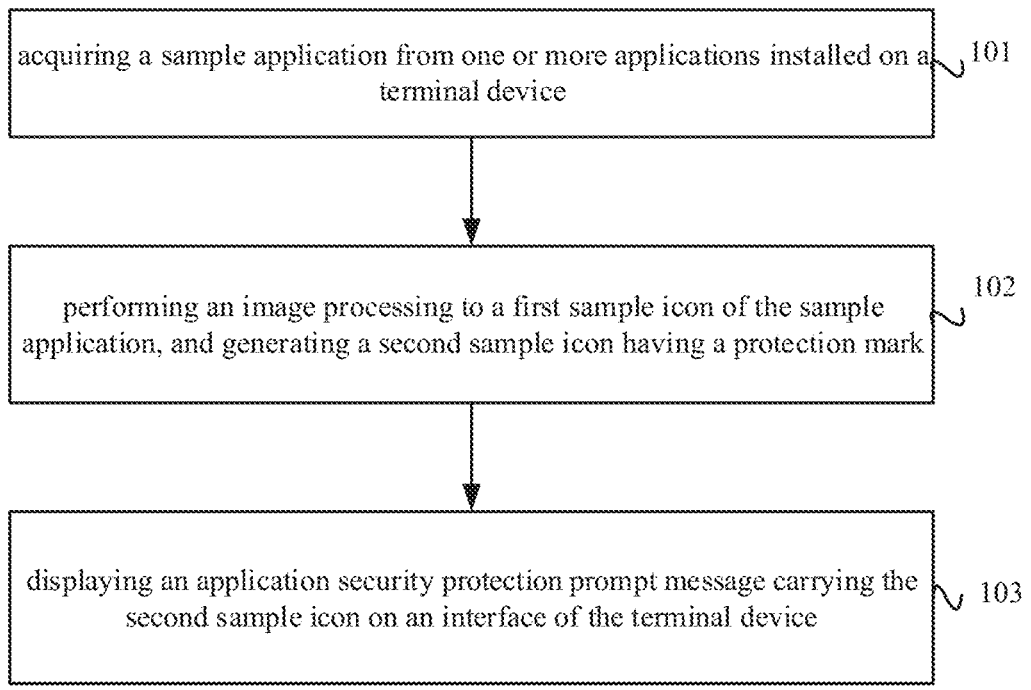
FIG. 1 is a flow chart illustrating an application security protection processing method according to an embodiment of the present disclosure.

Reference will be made in detail to embodiments of the present disclosure. Examples of the embodiments are illustrated in the drawings. The same or similar elements and the elements having same or similar functions are denoted by like reference numerals throughout the descriptions. The embodiments described herein with reference to drawings are explanatory and illustrative, used to generally understand the present disclosure and are not construed to limit the present disclosure.

The application security protection processing method and the application security protection processing device provided in embodiments of the present disclosure are described with reference to the drawings.

FIG. 1 is a flow chart illustrating an application security protection processing method according to an embodiment of the present disclosure.

As illustrated in FIG. 1, the application security protection processing method includes the followings.

At block 101, a sample application is acquired from one or more applications installed on a terminal device.

At least one application can be installed on the terminal device by the user according to a user own requirement. Therefore, the sample application is acquired from the at least one applications used by the user to perform an application security protection prompting, such that the user may acquire a necessity of security protection more directly.

In detail, the sample application may be acquired from the one or more applications installed on the terminal device in various manners. The various manners may be selected according to practical requirements, which is not limited in embodiment. For example, the various manners may include the followings.

Manner one: acquiring the sample application from the one or more applications installed on the terminal device includes the followings.

A country name where a user is located is acquired according to auxiliary information of the terminal device.

A pre-stored correspondence between country names and rank lists of applications is queried, and a rank list corresponding to the county name is acquired.

An application having a top rank is acquired from the one or more applications installed on the terminal device as the sample application according to the rank list.

In detail, the country name at which the user is located is acquired firstly according to the auxiliary information of the terminal device. The auxiliary information of the terminal device may have various representation forms. For example, the auxiliary information may include: a language on an interface of an operating system, a typewriting language of the user, a language selected when opening a website and the like. The country name where the user is located may be determined according to this auxiliary information.

Further, the pre-stored correspondence between country names and rank lists of applications is queried according to the country name where the user is located. The pre-stored correspondence between the country names and rank lists of applications is a database updated periodically. The database may be generated from wide sources and is recorded with the rank list having popular applications in each country. Through querying the pre-stored correspondence, the rank list corresponding to the country name where the user is located may be acquired.

Lastly, the sample application is determined by acquiring an application having a top rank from the one or more applications installed on the terminal device according to the rank list. In other words, a most popular application among the one or more applications installed on the terminal device is determined according to ranks of the applications included in the rank list, such that the most popular application is considered as the sample application.

For example, if the user is located in Taiwan, the most popular application among the applications installed on a phone is determined as LINE according to the rank list corresponding to Taiwan. As a result, the application LINE is considered as the sample application. For another example, if the user is located in America, the most popular application among the applications installed on the phone is Whatsapp according to the rank list corresponding to America. As a result, the application Whatsapp is determined as the sample application. For still another example, if the user is located in China, the most popular application among the applications installed on the phone is Wechat according to the rank list corresponding to China. As a result, the Wechat is considered as the sample application.

Manner two: acquiring the sample application from the one or more applications installed on the terminal device includes the followings.

A user log of the terminal device is queried.

An application having a longest usage period within a preset period is acquired as the sample application according to the user log.

In detail, the user log of the terminal device is queried firstly. In the user log, details about various applications used by the user on the terminal device are recorded, including a usage frequency, a usage period and the like.

Further, the application having the longest usage period within the preset period is acquired as the sample application according to the user log At block 102, an image processing is performed to a first sample icon of the sample application and a second sample icon having a protection mark is generated.

After the sample application is acquired from the one or more applications installed on the terminal device, the image processing is performed to the first sample icon of the sample application and the second sample icon having the protection mark is generated. Parameter information of the protection mark may include: shape information, color information and size information. The protection mark may be presented in various forms. The various forms may be selected according to practical requirements, which is not limited in embodiments of the present disclosure. For example, the protection mark may be presented in a shield shape. However a specific representation form is limited thereto. Furthermore, other representation forms configured to present or identify an application provider name or the applications may be employed.

There are various manners to perform the image processing to the first sample icon of the sample application and to generate the second sample icon having the protection mark, including a direct manner and an indirect manner. For example, the direct manner means that the second sample icon having the protection mark is directly rendered according to styles of the first sample icon and the protection mark via an image generating software.

In order to further improve image processing efficiency, the indirect manner may be utilized. The indirect manner includes the followings.

On the first sample icon, a protection region corresponding to the protection mark is determined firstly. Then, a user interface layer is generated. The user interface layer is rendered with the protection mark having boundaries coincident with boundaries of the protection region. Finally, the first sample icon is covered by the user interface layer, such that the protection mark covers the protection region, so as to generate the second sample icon having the protection mark.

At block 103, an application security protection prompt message carrying the second sample icon is displayed on an interface of the terminal device.

Figure 2:
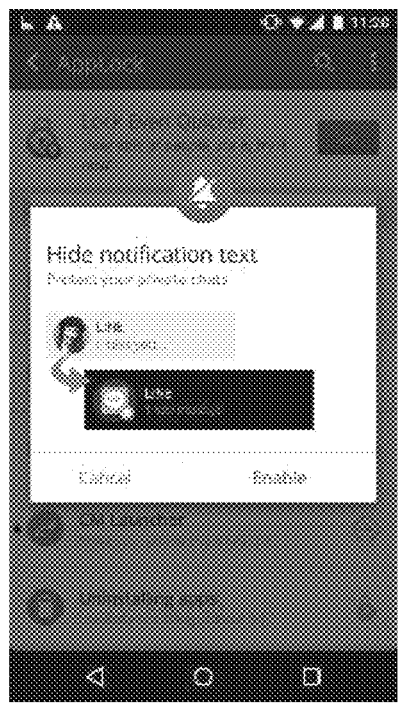
FIG. 2 is a first schematic diagram illustrating an application security protection prompt message.

After the second sample icon having the protection mark is generated, the application security protection prompt message carrying the second sample icon is displayed on the interface of the terminal device, so as to prompt the user. Therefore, the user may trigger a security protection to various applications installed on the terminal device. With reference to FIG. 2, FIG. 2 is a first schematic diagram illustrating an application security protection prompt message.

With the application security protection processing method according to embodiments of the present disclosure, the sample application is acquired firstly from the one or more applications installed on the terminal device. Then, the image processing is performed to the first sample icon of the sample application and the second sample icon having the protection mark is generated. Finally, the application security protection prompt message carrying the second sample icon is displayed on the interface of the terminal device. Therefore, it realizes that the user is prompted in time to perform a systematic security monitoring management regarding to various applications installed on the mobile terminal, thereby improving reliability and security.

Figure 3:
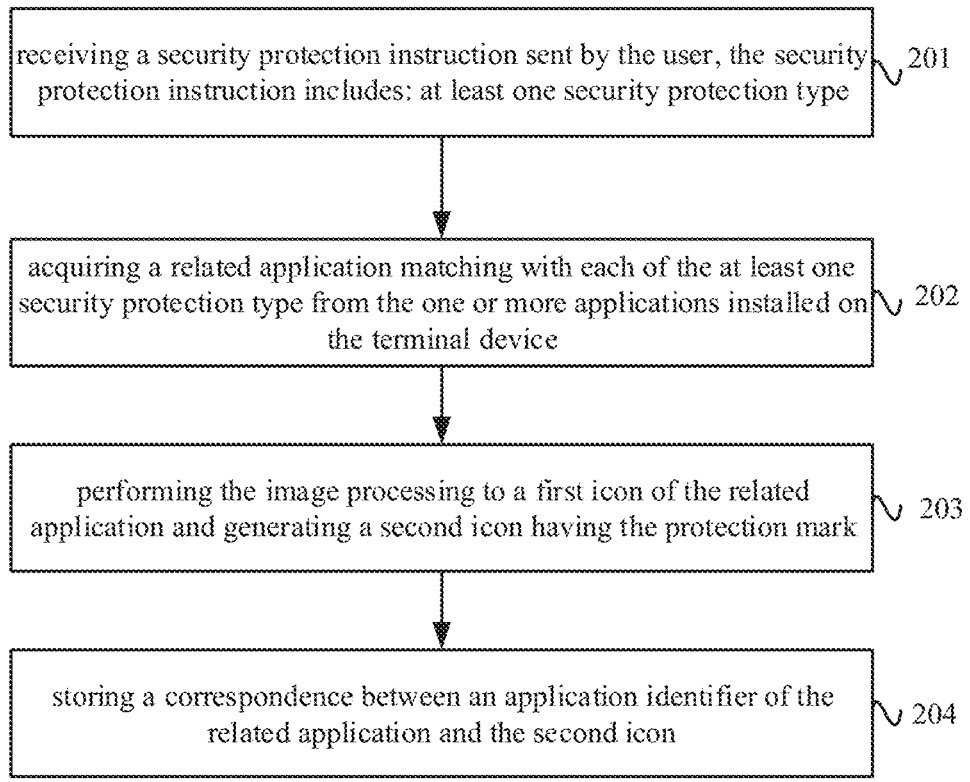
FIG. 3 is a flow chart illustrating an application security protection processing method according to another embodiment of the present disclosure.

FIG. 3 is a flow chart illustrating an application security protection processing method according to another embodiment of the present disclosure.

As illustrated in FIG. 3, regarding to an embodiment illustrated by FIG. 1, after the block 103, the application security protection processing method further includes the followings.

At block 201, a security protection instruction sent by the user is received. The security protection instruction may include: at least one security protection type.

When the application security protection prompt message carrying the second sample icon, which is displayed on the interface of the terminal device, is seen by the user, and it needs to perform the security protection to various applications installed on the terminal device, the security protection instruction is sent according to a required security protection type. The security protection instruction may include: at least one security protection type. It is to be illustrated that, there are many security protection types and the user may select at least one of them as needed. For example, the security protection types includes: power supply monitoring, memory monitoring, temperature monitoring, privacy monitoring and the like.

At block 202, a related application matching with each of the at least one security protection type is acquired from the one or more applications installed on the terminal device.

The security protection instruction sent by the user is phased to acquire the at least one security protection type. The related application matching with the security protection type is acquired according to functions of applications installed on the terminal device. For example, when the security protection type is the power supply monitoring, it needs to monitor the applications having huge power consumption or all running applications. When the security protection type is the privacy monitoring, it needs to monitor social applications.

At block 203, the image processing is performed to a first icon of the related application and a second icon having the protection mark is generated.

The image processing is performed to the first icon of the related application, so as to generate the second icon having the protection mark. The parameter information of the protection mark may include shape information, color information and size information. There are many representation forms of the protection mark. The representation forms may be selected according to practical requirements, which is not limited in embodiments of the present disclosure. For example, the protection mark is presented in a shield shape.

The image processing is performed to the first icon of the related application in various ways, so as to generate the second icon having the protection mark. The various ways include a direct way and an indirect way. Detailed implementations thereof may be seen at block 102, which is not elaborated herein.

At block 204, a correspondence between an identifier of the related application and the second icon is stored.

After the second sample icon having the protection mark is generated, the correspondence between the identifier of the related application and the second icon having the protection mark is stored, such that the correspondence may be invoked to perform a security prompting.

With the application security protection processing method according to embodiments of the present disclosure, the security protection instruction sent by the user is received firstly. The security protection instruction may include at least one security protection type. Then, the related application matching with each of the at least one security protection type is acquired according to functions of application installed on the terminal device, such that the second icon having the protection mark is generated by performing the image processing to the first icon of the related application. Finally, the correspondence between the identifier of the related application and the second icon is stored. Therefore, it realizes to manage the security monitoring of application in the terminal device, thereby improving the reliability and security.

Figure 4:
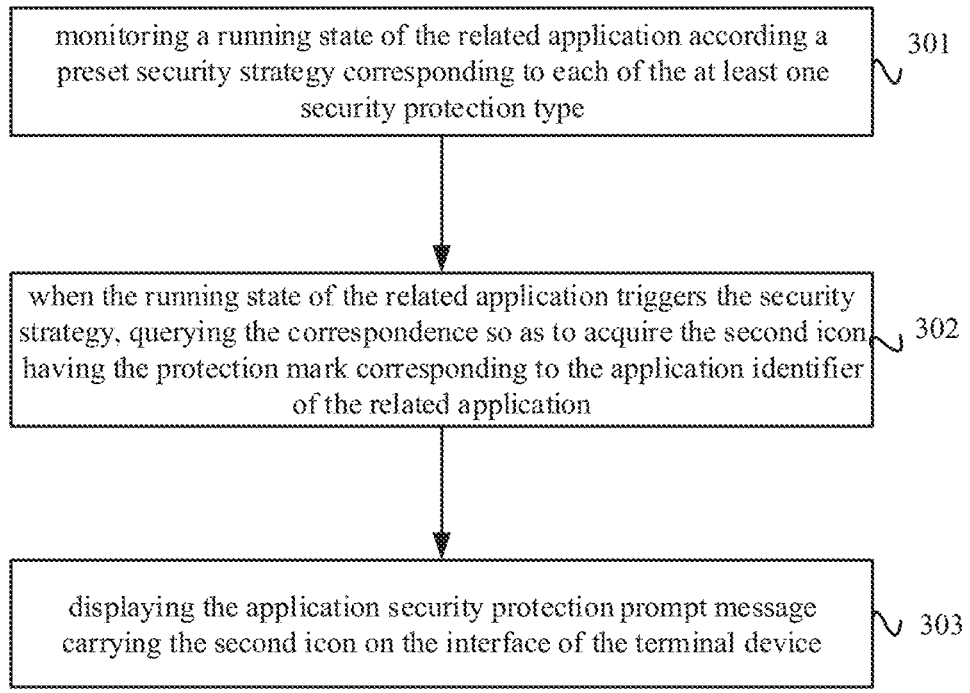
FIG. 4 is a flow chart illustrating an application security protection processing method according to another embodiment of the present disclosure.

FIG. 4 is a flow chart illustrating an application security protection processing method according to another embodiment of the present disclosure.

As illustrated in FIG. 4, regarding to the embodiment illustrated by FIG. 3, after the block 204, the application security protection processing method further includes the followings.

At block 301, a running state of the related application is monitored according a preset security strategy corresponding to each of the at least one security protection type.

At block 302, when the running state of the related application triggers the security strategy, the correspondence is queried so as to acquire the second icon having the protection mark corresponding to the identifier of the related application.

At block 303, the application security protection prompt message carrying the second icon is displayed on the interface of the terminal device.

In detail, during a process of performing the security protection to the applications installed on the mobile terminal, the running state of the related application is monitored according to the preset security strategy corresponding to each of the at least one security protection type. The security strategy may be adjusted according to a specific security protection type. The monitoring process may be illustrated as follows for example.

When the security protection type is power supply monitoring, it is monitored whether a power consumption amount and/or temperature caused by the related application exceeds a respective preset threshold. If it is monitored that the power consumption amount and/or the temperature caused by the related application exceeds the respective preset threshold, it is known that the running state of the related application triggers the security strategy. If it is monitored that the power consumption amount and/or the temperature caused by the related application does not exceed the respective preset threshold, it is known that the running state of the related application does not trigger the security strategy.

Figure 5:
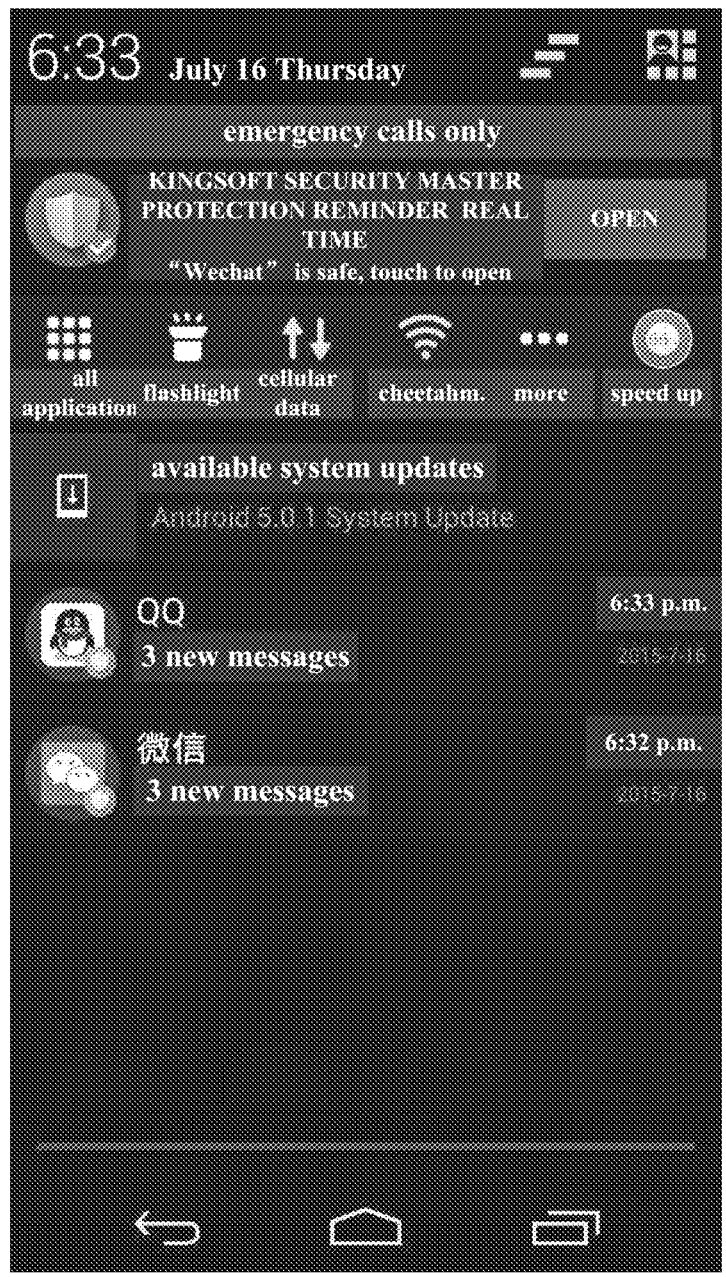
FIG. 5 is a second schematic diagram illustrating an application security protection prompt message.

When the security protection type is privacy monitoring, it is monitored whether an interactive message of the related application includes preset privacy content. If it is monitored that the interactive message of the related application includes the preset privacy content, it is known that the running state of the related application triggers the security strategy. If it is monitored that the interactive message of the related application does not include the preset privacy content, it is known that the running state of the related application does not trigger the security strategy. As illustrated in FIG. 5, FIG. 5 is a second schematic diagram illustrating an application security protection prompt message.

When the security protection type is memory monitoring, it is monitored whether a storage amount of the related application is greater than a preset limitation. If it is monitored that the storage amount of the related application is greater than the preset limitation, it is known that the running state of the related application triggers the security strategy. If it is monitored that the storage amount of the related application is not greater than the preset limitation, it is known that the running state of the related application does not trigger the security strategy.

With the application security protection processing method according to embodiments of the present disclosure, the running state of the related application is monitored firstly according to the preset security strategy corresponding to each of the at least one security protection type. If it is monitored that running state of the related application triggers the security strategy, the correspondence is queried so as to acquire the second icon having the protection mark corresponding to the identifier of the related application. The application security protection prompt message carrying the second icon is displayed on the interface of the terminal device. Therefore, it realizes that the user is prompted in time to perform a systematic security monitoring management regarding to various applications installed on the mobile terminal, thereby improving reliability and security.

In order to achieve the above embodiments, embodiments of the present disclosure further provide an application security protection processing device.

Figure 6:
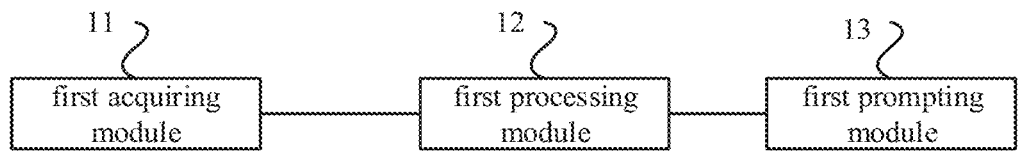
FIG. 6 is a block diagram illustrating an application security protection processing device according to an embodiment of the present disclosure.

FIG. 6 is a block diagram illustrating an application security protection processing device according to an embodiment of the present disclosure.

As illustrated in FIG. 6, the application security protection processing device includes a first acquiring module 11, a first processing module 12 and a first prompting module 13.

The first acquiring module 11 is configured to acquire a sample application from one or more applications installed on a terminal device.

The first processing module 12 is configured to perform an image processing to a first sample icon of the sample application, and to generate a second sample icon having a protection mark.

The first prompting module 13 is configured to display an application security protection prompt message carrying the second sample icon on an interface of the terminal device.

It is to be illustrated that, explanations of descriptions made to embodiments of the application security protection processing method are suitable for those of the application security protection processing device, which are not elaborated herein.

With the application security protection processing device according to embodiments of the present disclosure, the sample application is acquired firstly from the one or more applications installed on the terminal device. Then, the image processing is performed to the first sample icon of the sample application and the second sample icon having the protection mark is generated. Finally, the application security protection prompt message carrying the second sample icon is displayed on the interface of the terminal device. Therefore, it realizes that the user is prompted in time to perform a systematic security monitoring management regarding to various applications installed on the mobile terminal, thereby improving reliability and security.

Figure 7:
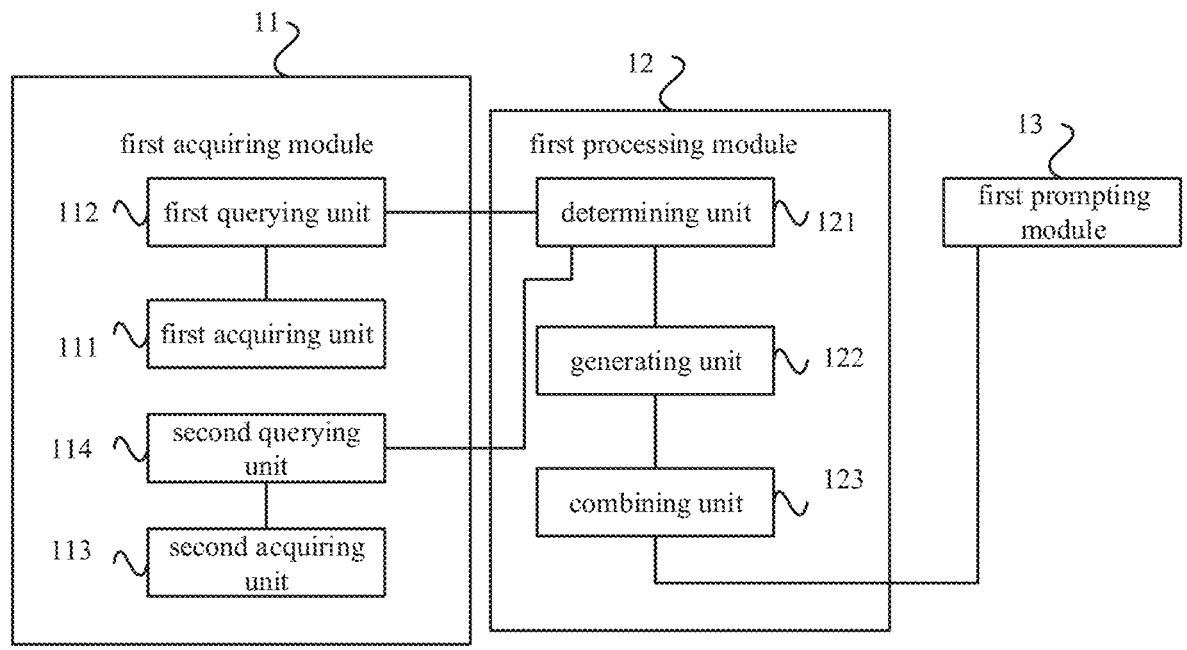
FIG. 7 is a block diagram illustrating an application security protection processing device according to another embodiment of the present disclosure.

FIG. 7 is a block diagram illustrating an application security protection processing device according to another embodiment of the present disclosure. As illustrated in FIG. 7, based on the embodiment illustrated by FIG. 6, the first acquiring module 11 includes: a first querying unit 111 and a first acquiring unit 112. Alternatively, the first acquiring module includes a second querying unit 113 and a second acquiring unit 114.

The first querying unit 111 is configured to acquire a country name where a user is located according to auxiliary information of the terminal device, to query a pre-stored correspondence between country names and rank lists of applications, and to acquire a rank list corresponding to the county name.

The first acquiring unit 112 is configured to acquire an application having a top rank from the one or more applications installed on the terminal device as the sample application according to the rank list.

The second querying unit 113 is configured to query a user log of the terminal device.

The second acquiring unit 114 is configured to acquire an application having a longest usage period within a preset period as the sample application according to the user log.

Further, the first processing module 12 includes a determining unit 121, a generating unit 122 and a combining unit 123.

The determining unit 121 is configured to determine, on the first sample icon, a protection region corresponding to the protection mark.

The generating unit 122 is configured to generate a user interface layer. The user interface layer is rendered with the protection mark having boundaries coincident with boundaries of the protection region.

The combining unit 123 is configured to cover the first sample icon by the user interface layer, such that the protection mark covers the protection region, so as to generate the second sample icon having the protection mark.

Parameter information of the protection mark may include shape information, color information and size information.

It is to be illustrated that, explanations of descriptions made to embodiments of the application security protection processing method are suitable for those of the application security protection processing device, which are not elaborated herein.

With the application security protection processing device according to embodiments of the present disclosure, the sample application is acquired firstly from the one or more applications installed on the terminal device. Then, the image processing is performed to the first sample icon of the sample application and the second sample icon having the protection mark is generated. Finally, the application security protection prompt message carrying the second sample icon is displayed on the interface of the terminal device. Therefore, it realizes that the user is prompted in time to perform a systematic security monitoring management regarding to various applications installed on the mobile terminal, thereby improving reliability and security.

Figure 8:
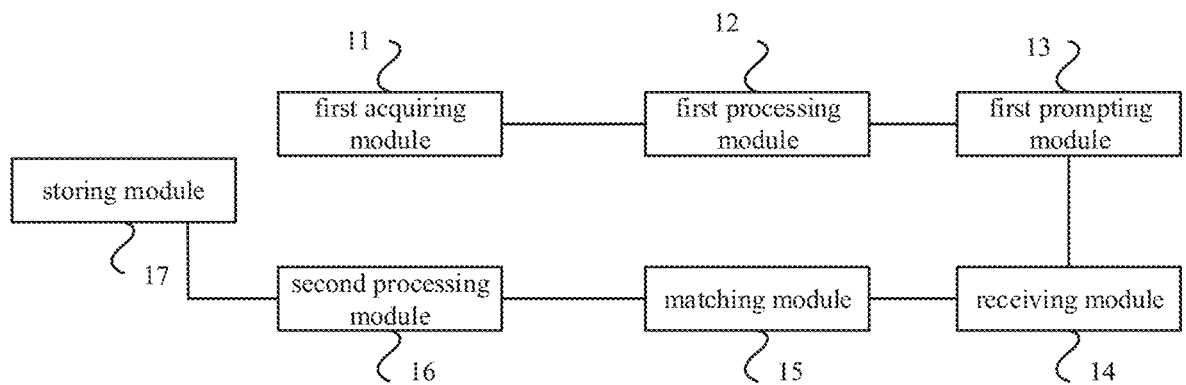
FIG. 8 is a block diagram illustrating an application security protection processing device according to another embodiment of the present disclosure.

FIG. 8 is a block diagram illustrating an application security protection processing device according to another embodiment of the present disclosure. As illustrated in FIG. 8, based on the embodiment illustrated by FIG. 6, the application security protection processing device further includes a receiving module 14, a matching module 15, a second processing module 16 and a storing module 17.

The receiving module 14 is configured to receive a security protection instruction sent by the user after the application security protection prompt message carrying the second sample icon is sent to a user. The security protection instruction may include: at least one security protection type.

The matching module 15 is configured to acquire a related application matching with each of the at least one security protection type from the one or more applications installed on the terminal device.

The second processing module 16 is configured to perform the image processing to a first icon of the related application and to generate a second icon having the protection mark.

The storing module 17 is configured to store a correspondence between an identifier of the related application and the second icon.

It is to be illustrated that, explanations of descriptions made to embodiments of the application security protection processing method are suitable for those of the application security protection processing device, which are not elaborated herein.

With the application security protection processing device according to embodiments of the present disclosure, the security protection instruction sent by the user is received firstly. The security protection instruction may include at least one security protection type. Then, the related application matching with each of the at least one security protection type is acquired according to functions of application installed on the terminal device, such that the second icon having the protection mark is generated by performing the image processing to the first icon of the related application. Finally, the correspondence between the identifier of the related application and the second icon is stored. Therefore, it realizes to manage the security monitoring of the terminal device, thereby improving the reliability and security.

Figure 9:
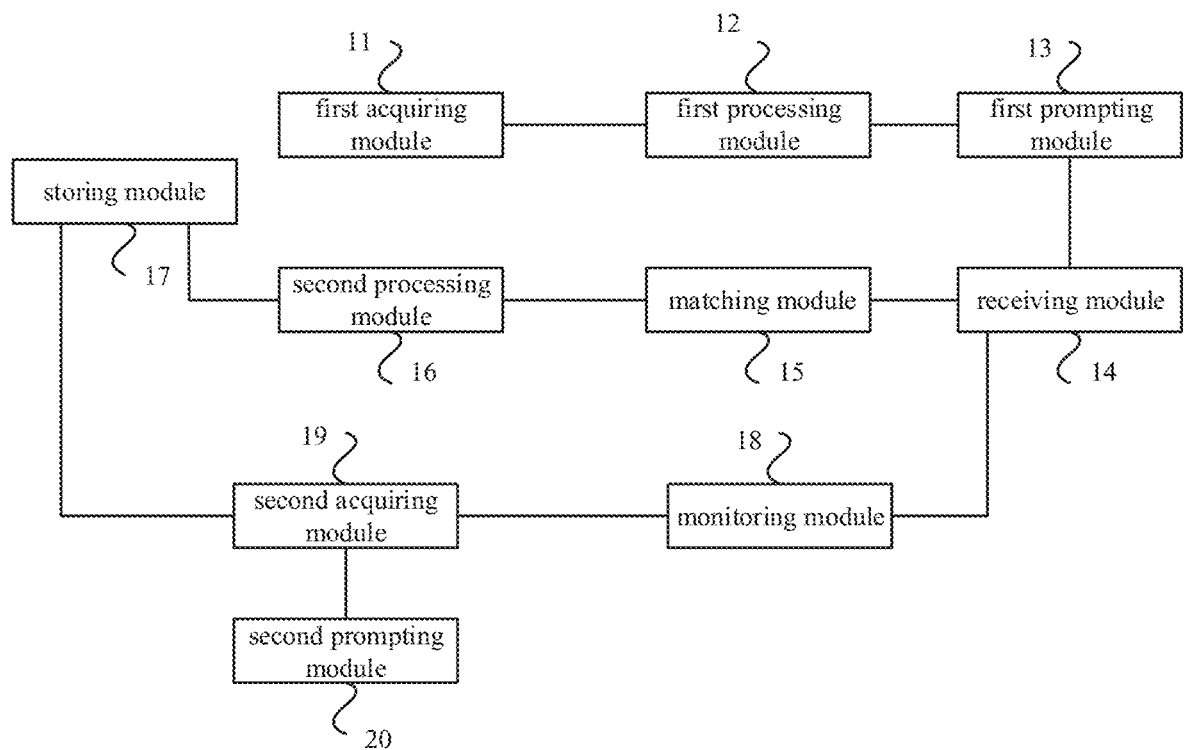
FIG. 9 is a block diagram illustrating an application security protection processing device according to another embodiment of the present disclosure.

FIG. 9 is a block diagram illustrating an application security protection processing device according to another embodiment of the present disclosure. As illustrated in FIG. 9, based on the embodiment illustrated by FIG. 8, the application security protection processing device further includes a monitoring module 18, a second acquiring module 19 and a second prompting module 20.

The monitoring module 18 is configured to monitor a running state of the related application according a preset security strategy corresponding to each of the at least one security protection type.

The second acquiring module 19 is configured to, when the running state of the related application triggers the security strategy, query the correspondence so as to acquire the second icon having the protection mark corresponding to the identifier of the related application.

The second prompting module 20 is configured to display the application security protection prompt message carrying the second icon on the interface of the terminal device.

When the at least one security protection type is power supply monitoring, the monitoring module 18 is configured to monitor whether a power consumption amount and/or temperature caused by the related application exceeds a respective preset threshold, and if yes to determine that the running state of the related application triggers the security strategy.

When the at least one security protection type is privacy monitoring, the monitoring module 18 is configured to monitor whether an interactive message of the related application includes preset privacy content, and if yes, to determine that the running state of the related application triggers the security strategy.

When the at least one security protection type is memory monitoring, the monitoring module 18 is configured to monitor whether a storage amount of the related application is greater than a preset limitation, and if yes, to determine that the running state of the related application triggers the security strategy.

It is to be illustrated that, explanations of descriptions made to embodiments of the application security protection processing method are suitable for those of the application security protection processing device, which are not elaborated herein.

With the application security protection processing device according to embodiments of the present disclosure, the running state of the related application is monitored firstly according to the preset security strategy corresponding to each of the at least one security protection type. If it is monitored that running state of the related application triggers the security strategy, the correspondence is queried so as to acquire the second icon having the protection mark corresponding to the identifier of the related application. The application security protection prompt message carrying the second icon is displayed on the interface of the terminal device. Therefore, it realizes that the user is prompted in time to perform a systematic security monitoring management regarding to various applications installed on the mobile terminal, thereby improving reliability and security.

Figure 10:
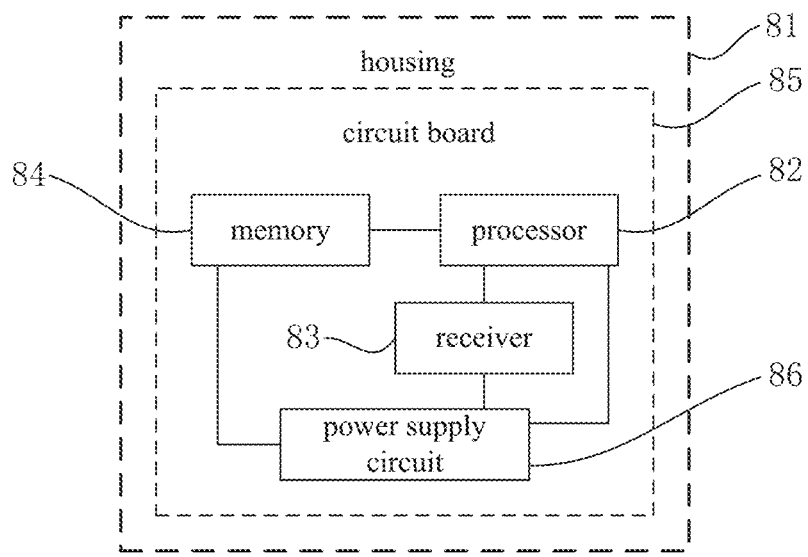
FIG. 10 is a block diagram illustrating a terminal device according to an embodiment of the present disclosure.

FIG. 10 is a block diagram illustrating a terminal device according to the present disclosure. With the terminal device provided in embodiments of the present disclosure, a procedure of the application security protection processing method provided in embodiments of the present disclosure may be achieved. The terminal device may be a smart phone, a smart watch, a tablet computer and the like. The specific form of the terminal device is not limited in embodiments of the present disclosure.

As illustrated in FIG. 10, the terminal device may include: a housing 81, a processor 82, a receiver 83, a memory 84, a circuit board 85 and a power supply circuit 86. The circuit board 85 is enclosed by the housing 81. The processor 82 and the memory 84 are positioned on the circuit board 85. The power supply circuit 86 is configured to provide power for respective circuits or components of the terminal device. The memory 84 is configured to store executable program codes. The processor 82 is configured to run a program corresponding to the executable program codes by reading the executable program codes stored in the memory 84, to perform: acquiring a sample application from one or more applications installed on a terminal device; performing an image processing to a first sample icon of the sample application, and generating a second sample icon having a protection mark; and displaying an application security protection prompt message carrying the second sample icon on an interface of the terminal device.

In at least one embodiment of the present disclosure, acquiring a sample application from one or more applications installed on a terminal device includes followings. A country name where a user is located is acquired according to auxiliary information of the terminal device. A pre-stored correspondence between country names and rank lists of applications is queried, and a rank list corresponding to the county name is acquired. An application having a top rank is acquired from the one or more applications installed on the terminal device as the sample application according to the rank list.

In at least one embodiment of the present disclosure, acquiring a sample application from one or more applications installed on a terminal device includes the followings. A user log of the terminal device is queried. An application having a longest usage period within a preset period is acquired as the sample application according to the user log.

In at least one embodiment of the present disclosure, performing an image processing to a first sample icon of the sample application, and generating a second sample icon having a protection mark includes the followings. On the first sample icon, a protection region corresponding to the protection mark is determined. A user interface layer is generated. The user interface layer is rendered with the protection mark having boundaries coincident with boundaries of the protection region. The first sample icon is covered by the user interface layer, such that the protection mark covers the protection region, so as to generate the second sample icon having the protection mark.

In at least one embodiment of the present disclosure, parameter information of the protection mark includes: shape information, color information and size information.

In at least one embodiment of the present disclosure, after the application security protection prompt message carrying the second sample icon is sent to a user, the processor 82 is further configured to perform the followings. A security protection instruction sent by the user is received. The security protection instruction includes: at least one security protection type. A related application matching with each of the at least one security protection type is acquired from the one or more applications installed on the terminal device. The image processing is performed to a first icon of the related application and a second icon having the protection mark is generated. A correspondence between an identifier of the related application and the second icon is stored.

In at least one embodiment of the present disclosure, the processor 82 is further configured to execute the followings. A running state of the related application is monitored according a preset security strategy corresponding to each of the at least one security protection type. If the running state of the related application triggers the security strategy, the correspondence is queried so as to acquire the second icon having the protection mark corresponding to the identifier of the related application. The application security protection prompt message carrying the second icon is displayed on the interface of the terminal device.

In at least one embodiment of the present disclosure, when the at least one security protection type is power supply monitoring, monitoring a running state of the related application according a preset security strategy corresponding to each of the at least one security protection type includes the followings. It is monitored whether a power consumption amount and/or temperature caused by the related application exceeds a respective preset threshold, if yes, it is known that the running state of the related application triggers the security strategy.

In at least one embodiment of the present disclosure, when the at least one security protection type is privacy monitoring, monitoring a running state of the related application according a preset security strategy corresponding to each of the at least one security protection type includes the followings. It is monitored whether an interactive message of the related application includes preset privacy content; if yes, it is known that the running state of the related application triggers the security strategy.

In at least one embodiment of the present disclosure, when the at least one security protection type is memory monitoring, monitoring a running state of the related application according a preset security strategy corresponding to each of the at least one security protection type includes the followings. It is monitored whether a storage amount of the related application is greater than a preset limitation, if yes, it is known that the running state of the related application triggers the security strategy.

With the terminal device, via the application security protection processing method, the sample application is acquired firstly from the one or more applications installed on the terminal device. Then, the image processing is performed to the first sample icon of the sample application and the second sample icon having the protection mark is generated. Finally, the application security protection prompt message carrying the second sample icon is displayed on the interface of the terminal device. Therefore, it realizes that the user is prompted in time to perform a systematic security monitoring management regarding to various applications installed on the mobile terminal, thereby improving reliability and security.

Further, embodiments of the present disclosure further provide a storage medium with one or more modules stored. When the one or more modules are executed by an electronic device, the electronic device is configured to execute the application security protection processing method described by any one of embodiments above.

Further, embodiments of the present disclosure further provide an application program. When the application program is running, the application security protection processing method described by any one of embodiments above is executed.

In the specification, terms such as "an embodiment," "some embodiments," "one embodiment", "another example," "an example," "a specific example," or "some examples," means that a particular feature or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features or characteristics may be combined in any suitable manner in one or more embodiments or examples. Besides, any different embodiments and examples and any different characteristics of embodiments and examples may be combined without contradiction.

In addition, terms such as "first" and "second" are configured herein for purposes of description and are not intended to indicate or imply relative importance or significance. Therefore, features defined with "first" and "second" may indicate or imply as at least one feature. Furthermore, in the description of the present disclosure, "a plurality of" refers to more than two, for example two, unless otherwise specified.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the functions may be executed in other orders instead of the order illustrated or discussed, including in a basically simultaneous manner or in a reverse order, which should be understood by those skilled in the art.

The logic and/or steps described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An application security protection processing method, comprising:
   acquiring a sample application from one or more applications installed on a terminal device;
   performing an image processing to a first sample icon of the sample application, and generating a second sample icon having a protection mark; and
   displaying an application security protection prompt message carrying the second sample icon on an interface of the terminal device;
   wherein acquiring a sample application from one or more applications installed on a terminal device comprises:
      acquiring a country name where a user is located according to auxiliary information of the terminal device;
      querying a pre-stored correspondence between country names and rank lists of applications, and acquiring a rank list corresponding to the county name; and
      acquiring an application having a top rank from the one or more applications installed on the terminal device as the sample application according to the rank list.

2. The application security protection processing method according to claim 1, wherein acquiring a sample application from one or more applications installed on a terminal device comprises:
   querying a user log of the terminal device; and
   acquiring an application having a longest usage period within a preset period as the sample application according to the user log.

3. The application security protection processing method according to claim 1, wherein performing an image processing to a first sample icon of the sample application and generating a second sample icon having a protection mark comprises:
   determining, on the first sample icon, a protection region corresponding to the protection mark;
   generating a user interface layer, wherein the user interface layer is rendered with the protection mark having boundaries coincident with boundaries of the protection region; and
   covering the first sample icon by the user interface layer, such that the protection mark covers the protection region, so as to generate the second sample icon having the protection mark.

4. The application security protection processing method according to claim 1, wherein parameter information of the protection mark comprises:
   shape information, color information and size information.

5. The application security protection processing method according to claim 1, wherein, after the application security protection prompt message carrying the second sample icon is sent to a user, the application security protection processing method further comprises:
   receiving a security protection instruction sent by the user, wherein the security protection instruction comprises at least one security protection type;
   acquiring a related application matching with each of the at least one security protection type from the one or more applications installed on the terminal device;

performing the image processing to a first icon of the related application and generating a second icon having the protection mark; and storing a correspondence between an identifier of the related application and the second icon.

6. The application security protection processing method according to claim 5, further comprising:

monitoring a running state of the related application according a preset security strategy corresponding to each of the at least one security protection type;

when the running state of the related application triggers the security strategy, querying the correspondence so as to acquire the second icon having the protection mark corresponding to the identifier of the related application; and displaying the application security protection prompt message carrying the second icon on the interface of the terminal device.

7. The application security protection processing method according to claim 6, wherein, when the at least one security protection type is power supply monitoring, monitoring a running state of the related application according a preset security strategy corresponding to each of the at least one security protection type comprises:

monitoring whether a power consumption amount and/or temperature caused by the related application exceeds a respective preset threshold, and if yes, determining that the running state of the related application triggers the security strategy.

8. The application security protection processing method according to claim 6, wherein, when the at least one security protection type is privacy monitoring, monitoring a running state of the related application according a preset security strategy corresponding to each of the at least one security protection type comprises:

monitoring whether an interactive message of the related application comprises preset privacy content, and if yes, determining that the running state of the related application triggers the security strategy.

9. The application security protection processing method according to claim 6, wherein, when the at least one security protection type is memory monitoring, monitoring a running state of the related application according a preset security strategy corresponding to each of the at least one security protection type comprises:

monitoring whether a storage amount of the related application is greater than a preset limitation, and if yes, determining that the running state of the related application triggers the security strategy.

10. A terminal device, comprising: a housing, a processor, a receiver, a memory, a circuit board and a power supply circuit, wherein the circuit board is enclosed by the housing; the processor and the memory are positioned on the circuit board; the power supply circuit is configured to provide power for respective circuits or components of the terminal device; the memory is configured to store executable program codes; and the processor is configured to run a program corresponding to the executable program codes by reading the executable program codes stored in the memory, to perform an application security protection processing method, the method comprising:

acquiring a sample application from one or more applications installed on a terminal device;

performing an image processing to a first sample icon of the sample application, and generating a second sample icon having a protection mark; and displaying an application security protection prompt message carrying the second sample icon on an interface of the terminal device;

wherein acquiring a sample application from one or more applications installed on a terminal device comprises:

acquiring a country name where a user is located according to auxiliary information of the terminal device;

querying a pre-stored correspondence between country names and rank lists of applications, and acquiring a rank list corresponding to the county name; and acquiring an application having a top rank from the one or more applications installed on the terminal device as the sample application according to the rank list.

11. The terminal device according to claim 10, wherein acquiring a sample application from one or more applications installed on a terminal device comprises:

querying a user log of the terminal device; and acquiring an application having a longest usage period within a preset period as the sample application according to the user log.

12. The terminal device according to claim 10, wherein performing an image processing to a first sample icon of the sample application and generating a second sample icon having a protection mark comprises:

determining, on the first sample icon, a protection region corresponding to the protection mark;

generating a user interface layer, wherein the user interface layer is rendered with the protection mark having boundaries coincident with boundaries of the protection region; and covering the first sample icon by the user interface layer, such that the protection mark covers the protection region, so as to generate the second sample icon having the protection mark.

13. The terminal device according to claim 10, wherein, after the application security protection prompt message carrying the second sample icon is sent to a user, the application security protection processing method further comprises:

receiving a security protection instruction sent by the user, wherein the security protection instruction comprises at least one security protection type;

acquiring a related application matching with each of the at least one security protection type from the one or more applications installed on the terminal device;

performing the image processing to a first icon of the related application and generating a second icon having the protection mark; and storing a correspondence between an identifier of the related application and the second icon.

14. The terminal device according to claim 13, wherein the application security protection processing method further comprises:

monitoring a running state of the related application according a preset security strategy corresponding to each of the at least one security protection type;

when the running state of the related application triggers the security strategy, querying the correspondence so as to acquire the second icon having the protection mark corresponding to the identifier of the related application; and displaying the application security protection prompt message carrying the second icon on the interface of the terminal device.

15. The terminal device according to claim 14, wherein, when the at least one security protection type is power supply monitoring,
monitoring a running state of the related application according a preset security strategy corresponding to each of the at least one security protection type comprises:
monitoring whether a power consumption amount and/or temperature caused by the related application exceeds a respective preset threshold, and if yes, determining that the running state of the related application triggers the security strategy.

16. The terminal device according to claim 14, wherein, when the at least one security protection type is privacy monitoring,
monitoring a running state of the related application according a preset security strategy corresponding to each of the at least one security protection type comprises:
monitoring whether an interactive message of the related application comprises preset privacy content, and if yes, determining that the running state of the related application triggers the security strategy.

17. The terminal device according to claim 14, wherein, when the at least one security protection type is memory monitoring,
monitoring a running state of the related application according a preset security strategy corresponding to each of the at least one security protection type comprises:
monitoring whether a storage amount of the related application is greater than a preset limitation, and if yes, determining that the running state of the related application triggers the security strategy.

18. A non-transitory computer-readable storage medium, having one or more modules stored, wherein when the one or more modules are executed by an electronic device, the electronic device is configured to execute an application security protection processing method, the method comprising:
acquiring a sample application from one or more applications installed on a terminal device;
performing an image processing to a first sample icon of the sample application, and generating a second sample icon having a protection mark; and
displaying an application security protection prompt message carrying the second sample icon on an interface of the terminal device;
wherein acquiring a sample application from one or more applications installed on a terminal device comprises:
acquiring a country name where a user is located according to auxiliary information of the terminal device;
querying a pre-stored correspondence between country names and rank lists of applications, and acquiring a rank list corresponding to the county name; and
acquiring an application having a top rank from the one or more applications installed on the terminal device as the sample application according to the rank list.

* * * * *